Oct. 4, 1927.
H. MARLES
1,644,261
ENGINE CONTROL MECHANISM
Filed Oct. 25, 1926
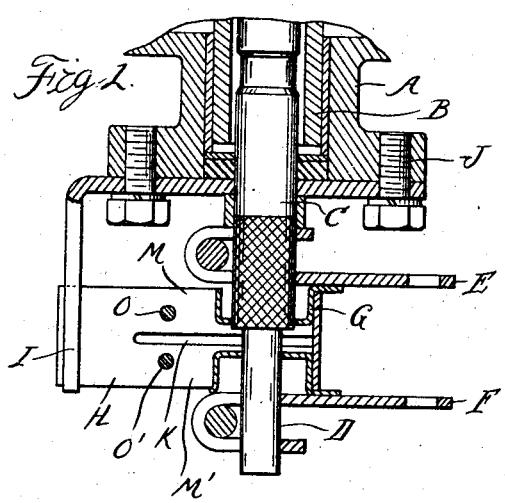
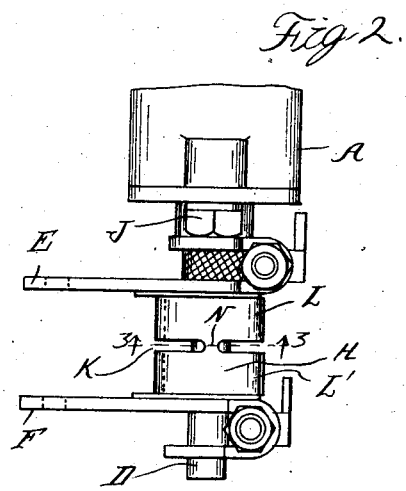
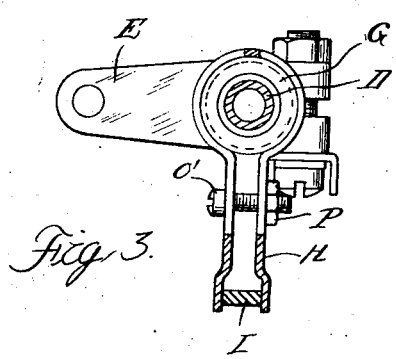
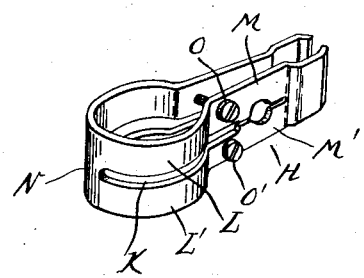
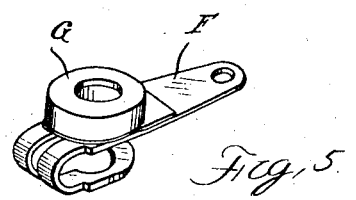
Inventor
Henry Marles
By Whittemore Hulbert
Whittemore & Belknap
Attorneys Patented Oct. 4, 1927.

1,644,261

UNITED STATES PATENT OFFICE.

HENRY MARLES, OF DETROIT, MICHIGAN, ASSIGNOR TO GEMMER MANUFACTURING COMPANY, OF DETROIT, MICHIGAN, A CORPORATION OF MICHIGAN.

ENGINE CONTROL MECHANISM.

Application filed October 25, 1926. Serial No. 144,122.

The invention relates to engine control mechanisms associated with the steering wheels of motor vehicles and has particular reference to the means for frictionally holding the controls from displacement during rotation of the steering wheel. To this end the invention consists in the construction as hereinafter set forth.

In the drawings;

Figure 1 is a central longitudinal section through the lower portion of a steering column of a motor vehicle to which the invention is applied.

Figure 2 is an elevation at right angles to Figure 1.

Figure 3 is a section on line 3—3 of Figure 2.

Figures 4 and 5 are perspective views respectively of the combined brake band and anchor arm and one of the friction drums.

Control mechanisms which are operated through the steering column must be held from displacement during manipulation of the steering wheel. This is sometimes accomplished by friction means located above the steering wheel but this necessitates a stationary anchor tube which passes through the column. With other constructions the friction means for holding the controls is located below the steering column and it is to this class that the present improvement belongs.

As shown A is the lower end portion of the stationary steering post; B the rotary steering stem swivelled therein and C and D are control rods concentrically arranged and passing through said column and stem. The rod C is tubular and projects beyond the lower end of the column A as shown. The rod D may be solid and extends through the tubular rod C and beyond the lower end thereof. E and F are rock arms which are clamped respectively to the projecting ends of the rods C and D.

To frictionally hold the rods C and D from displacement either by the rotation of one from the other or by the rotation of the tubular steering stem, each of the rock arms E and F is provided with a friction drum G. These drums may be formed of sheet metal stampings welded or otherwise secured to the said arms and extending oppositely therefrom in the space therebetween. H is a member preferably formed from a sheet metal blank bent to form in its central portion a circular segment for embracing the drums G and also having radially extending end portions for engaging an anchor post I. This post may be formed of a member bolted or otherwise secured to the column A as indicated at J and having a portion extending parallel to the rods C and D to engage the member H. The member H is also slotted at K, said slot extending centrally upon opposite sides of the circular segment to form the portions L, L' and also along the radial portions to form the separate arms M, M'. At their outer ends these arms are connected by the termination of the slot K and a narrow tie N connects the segments L, L' diametrically opposite said radial portions. O, O' are screws extending through registering apertures in the portions M, N and M', N', and P are clamping nuts engaging said screws.

With the construction just described when the parts are assembled, the circular segments L, L' will embrace the drums G, G' of the arms E and F while the radial portions M, M' extend outward to embrace at their outer ends the anchor member I. When the screws O, O' are tightened they will circumferentially radially contract the portions L, L' so as to obtain any desired friction upon the drums G, G'. At the same time the screws O, O' will clamp the radial portions M, M' to the anchor post I. Thus, by suitable adjustment of the screws O, O' the rotation of the rods C and D may be frictionally resisted to any desired degree and independently of each other. This independence of adjustment is important as the amount of resistance required for one rod differs from that best for the other or that a single strap or shoe would be unsatisfactory for engagement with both rods.

The construction is exceedingly simple and easy to manufacture and can be readily assembled and adjusted.

What I claim as my invention is:

1. The combination with a tubular steering stem of a rotatable control rod passing therethrough and projecting therebeyond, a drum attached to said rod, a member having a portion extending circumferentially around said drum and then extending radially outward therefrom, an anchor for the outer end of said member and means for variably circumferentially contracting said member to place the desired frictional resistance upon said drum.

2. The combination with a tubular steering stem, of a rotatable control rod passing therethrough and projecting therebeyond, a rock arm mounted upon said rod, a brake drum secured to and projecting from said rock arm and concentric with the axis of said rod, a member having a segmental circular portion embracing said drum and radially extending end portions, an anchor engaging the outer ends of said radially projecting portions and a clamping screw for drawing said radial portions toward each other to circumferentially contract said segmental portion and to place the desired degree of friction upon said drum.

3. The combination with a tubular steering stem, of a tubular control rod extending therethrough and projecting therebeyond, a second control rod extending through and beyond said tubular control rod, rock arms clamped to the projecting ends of said control rods, drums secured to said rock arms and projecting oppositely therefrom in the space therebetween and concentric with the axis of said rod, a member bent to form a segmental central portion surrounding said drums and projecting radially therefrom, said member being centrally slotted to divide said segmental and radial portions into parallel sections, an anchor engaging the outer end of said radial portions and separate screws connecting the pairs of radial arms on opposite sides of the slot permitting independent circumferential and radial contraction of the segmental portions embracing the respective drums to hold the control rods from displacement.

4. The combination with a tubular steering stem, of a tubular control rod passing therethrough and projecting therebeyond, a second control rod passing through said tubular control rod and projecting therebeyond, rock arms clamped to the projecting portions of said control rods, drums concentric with the axis of said rods secured to said rock arms and projecting oppositely therefrom in the space therebetween, a member formed from sheet metal having a central segmental portion embracing said drum and end portions projecting radially therefrom, said member being centrally slotted to separate the portions engaging said drums from each other, an anchor extending parallel to said rods and embraced by the outer end of said sheet metal member, and separate clamping screws for connecting the pairs of radial arms on opposite sides of said slot adapted to circumferentially and radially contract the respective segmental portions to frictionally resist rotation of the drums with the rods to which they are attached.

5. The combination with a tubular steering stem, of a tubular control rod extending therethrough and projecting therebeyond, a second control rod extending through and beyond said tubular control rod, rock arms clamped to the projecting ends of said control rods, drums secured to said rock arms and projecting oppositely therefrom in the space therebetween and concentric with the axis of said rod, a member bent to form a segmental central portion surrounding said drums and projecting radially therefrom, said member being centrally slotted to divide said segmental and radial portions into parallel sections, an anchor engaging the outer end of said radial portions and means intermediate said anchor and drums for independently clamping the parallel sections of said radial portions to independently adjust the friction of said segmental portions on the drums.

In testimony whereof I affix my signature.

HENRY MARLES.